UNITED STATES PATENT OFFICE.

JOHN MCELROY WHITE, OF MERIDIAN, MISSISSIPPI.

ARSENICAL MEDICAL PRODUCT AND PROCESS OF PRODUCING SAME.

1,297,952.  Specification of Letters Patent.  Patented Mar. 18, 1919.

No Drawing.  Application filed May 4, 1918. Serial No. 232,669.

*To all whom it may concern:*

Be it known that I, JOHN M. WHITE, a citizen of the United States, residing at Meridian, in the county of Lauderdale and State of Mississippi, have invented a certain new and useful Arsenical Medical Product and Process of Producing Same, of which the following is a specification.

The present invention relates to a new arsenic compound which I have found to be an excellent remedy for syphilis and other like diseases, and to a process of preparing said compound.

It is well known that many arsenical organic bodies possess the power of curing syphilis, but up to the time of my invention, the substances giving the most useful results were not capable of being administered in the form of aqueous solutions, but only when dissolved in or mixed with oily bodies, and the use of oily vehicles for medicines to be injected into the human organism is open to serious objection, and the medicines so administered lose a considerable portion of their effectiveness, due to the non-miscibility of the vehicle of the medicine and those fluids of the human body with which they come into contact.

I have now found that an arsenic compound of highly improved antisyphilitic properties can be prepared by reacting with sodium benzoate upon sodium cacodylate in an aqueous solution, the product apparently having the formula:

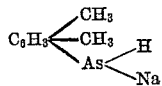

In the preferred form of execution I mix about one part of sodium benzoate with two parts of sodium cacodylate, pulverize the materials, add about 40 parts of distilled water, and stir until solution of the chemicals is effected. The reaction taking place may be expressed as follows:—

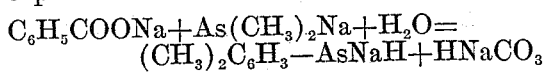

Obviously in place of the sodium compounds given in this example, the corresponding potassium salts can be used.

The bicarbonate can be decomposed by adding lime water, if desired, but this is not necessary. An excess of lime water should not be added. After filtration, if necessary, the solution of the arsenic compound may be evaporated to dryness, for example, in a vacuum evaporator.

The dimethylo phenylene hydrogen sodium arsenid thus prepared is a white solid, can be melted without decomposition at about 280° F., is freely soluble in water, both hot and cold, is soluble in a number of the common organic solvents, such as alcohol, ether, glycerin. The alkaline solution and the neutral solution (in water) are both stable in the air.

For use in syphilis, the most convenient mode known to me is to inject, into the muscles or into the venous circulation, about .27 gram, dissolved in say 4 to 15 c. c. of distilled water. For this purpose the sodium bicarbonate may be left in the material (*i. e.*, the mixed solution directly evaporated to dryness) and the presence of this material, of course, being taken into consideration when computing the dose to be used for a single treatment.

In the above description, sodium cacodylate (sodium dimethyl arsenid) is mentioned, this being a suitable alkali metal methyl arsenid to employ. Substances generally which contain arsenic united to methyl and an alkali metal, can also be employed in the process.

Having described my invention, what I claim as new and desire to secure by Letters Patent is,—

1. As new products, the herein described arsenic compounds constituting the reaction products of an alkali metal benzoate and an alkali metal methyl arsenid, such products being white solids, freely soluble in hot and cold water, and in alcohol, ether and glycerin, the neutral and alkaline solutions in these solvents being stable in the air, said products being powerful antisyphilitics, and the sodium dimethyl compound melting at about 280° F.

2. As a new product, dimethylo phenylene hydrogen sodium arsenid,

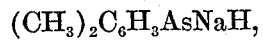

the same being a white solid, soluble in hot and cold water and having antisyphilitic properties.

3. A process of preparing an arsenical product which comprises reacting upon an alkali metal benzoate with an alkali metal cacodylate.

4. A process of preparing an arsenical medicinal substance which comprises reacting upon sodium benzoate with sodium cacodylate in an aqueous solution, and then adding lime water to the resulting product.

In testimony whereof I have signed my name to this specification.

JOHN MCELROY WHITE.